United States Patent [19]

Gillespie

[11] Patent Number: 4,940,214
[45] Date of Patent: Jul. 10, 1990

[54] APPARATUS FOR GENERATING A VORTEX IN A MELT

[75] Inventor: John R. Gillespie, Ballwin, Mo.

[73] Assignee: Gillespie & Powers, Inc., St. Louis, Mo.

[21] Appl. No.: 324,041

[22] Filed: Mar. 16, 1989

Related U.S. Application Data

[62] Division of Ser. No. 235,163, Aug. 23, 1988.

[51] Int. Cl.$^5$ .............................................. C21D 11/00
[52] U.S. Cl. ...................................... 266/235; 261/84
[58] Field of Search ...................... 266/235, 200, 234; 261/84

[56] References Cited

U.S. PATENT DOCUMENTS

| | | | |
|---|---|---|---|
| 3,984,234 | 11/1976 | Claxton et al. | 266/235 |
| 3,997,336 | 12/1976 | van Linden et al. | 266/235 |
| 4,128,415 | 12/1978 | van Linden et al. | 266/235 |
| 4,322,245 | 3/1982 | Claxton | 266/235 |
| 4,486,228 | 12/1984 | Ormesher | 75/65 R |
| 4,518,424 | 5/1985 | Ormesher | 75/65 R |
| 4,598,899 | 7/1986 | Cooper | 266/235 |

FOREIGN PATENT DOCUMENTS 0695688 11/1979 U.S.S.R. .................................. 261/84

*Primary Examiner*—Scott Kastler
*Attorney, Agent, or Firm*—Gravely, Lieder & Woodruff

[57] ABSTRACT

A furnace maintains metal in a molten condition as a melt, and part of the melt is exposed in a charging well where lightweight solid scrap is introduced into the furnace. A vortex generator imparts a vortex to the melt within the well, so that lightweight solid scrap is quickly submerged in the well. The vortex generator includes an impeller which rotates within the well and actually creates the vortex. In addition, it has an elevator from which the impeller is suspended as well as a drive motor for turning the impeller, with the motor being on the elevator. An elevator frame serves to guide the elevator and the elevator frame is in turn connected to a trolley which runs along a track that passes over the charging well, but also extends well beyond it. An elevating mechanism adjusts the height of the elevator and elevator frame with respect to the trolley and is normally set so that the impeller is immersed in the melt and the elevator frame is engaged with the furnace at the charging well to resist torque imposed by the drive motor. However, the elevating mechanism raises the carrier enough to bring the impeller totally out of the well and the elevator frame enough to disengage it from the portion of the furnace surrounding the charging well, whereupon the entire vortex mechanism may be moved along the track to a position remote from the well. This eases maintenance of both the generator and well and further facilitates charging the well with scrap.

18 Claims, 6 Drawing Sheets

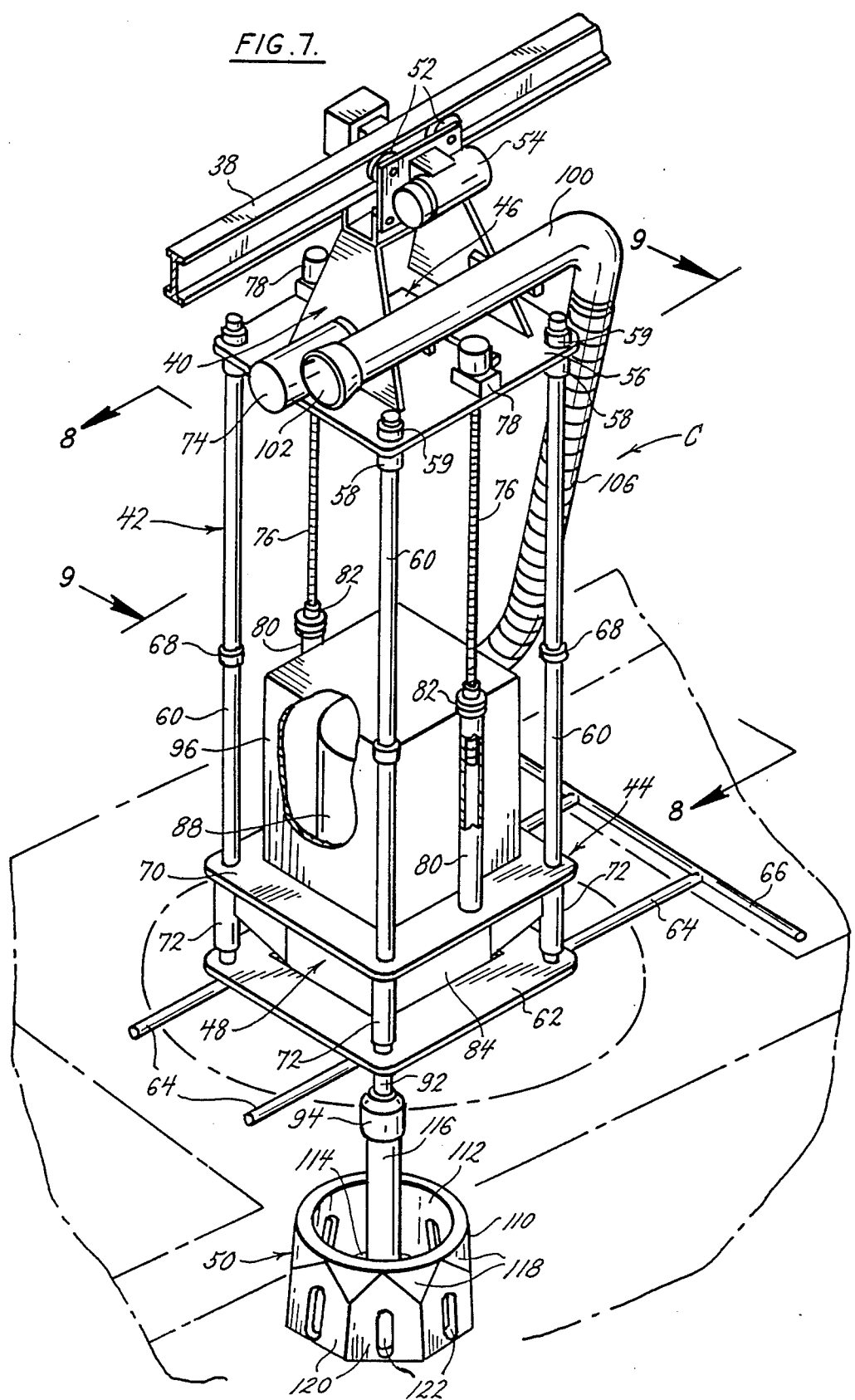

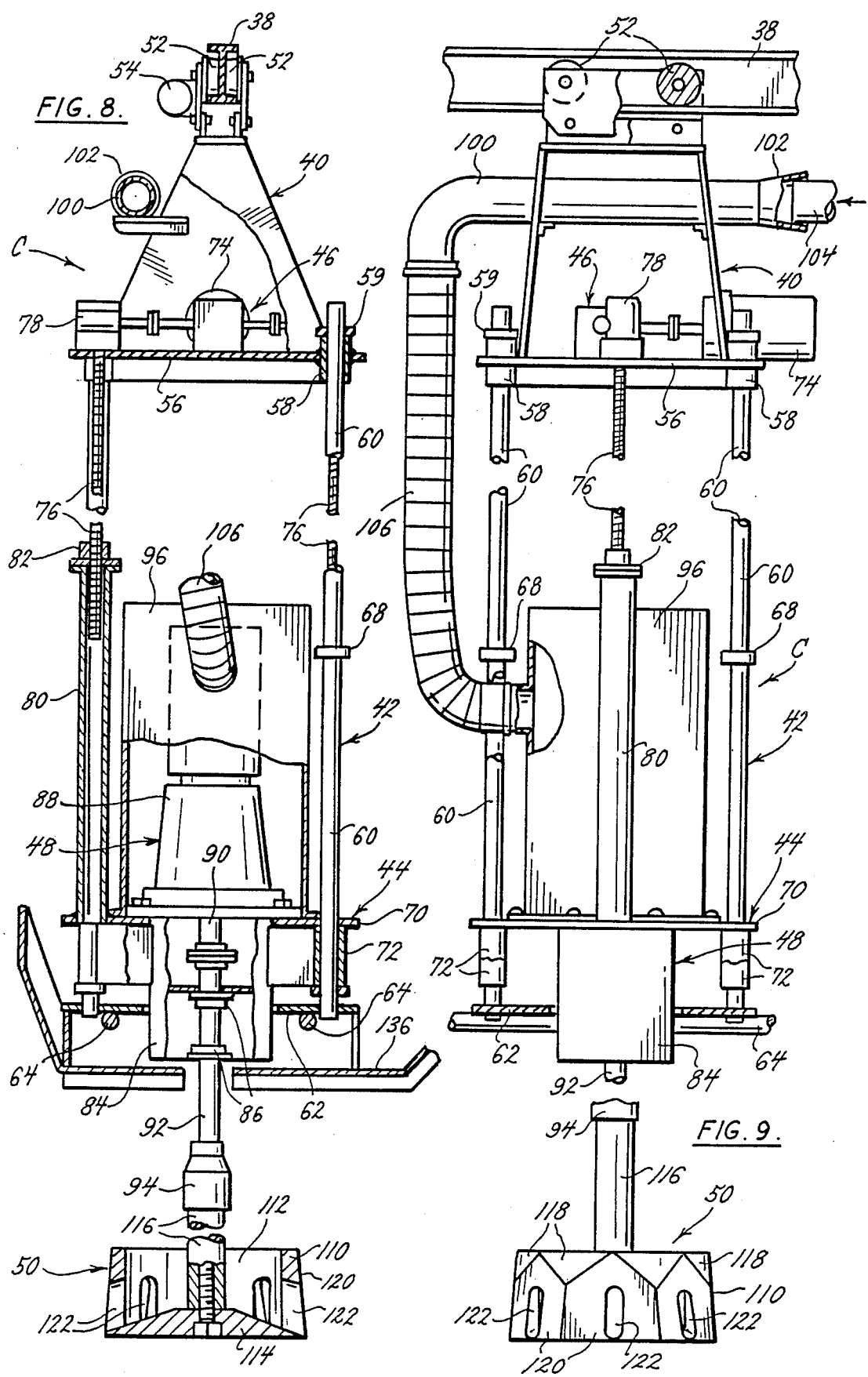

APPARATUS FOR GENERATING A VORTEX IN A MELT

This application is a division of application Ser. No. 235,165, filed Aug. 23, 1988.

BACKGROUND OF THE INVENTION

This invention relates to the processing of metals, and more particularly to an apparatus for generating a vortex in a melt of molten metal to facilitate the submergence of solid metal into that melt.

The lightweight metal aluminum posesses characteristics which render it suitable for use in many manufactured goods, and much of the aluminum used in such goods derives from aluminum scrap. Typically the scrap is reduced to a melt in a furnace, and the melt in turn is cast into ingots, which are sold to manufacturers of aluminum products.

The typical aluminum furnace contains an enclosed chamber which holds a melt and above the melt has burners which direct flames over the melt to produce enough heat to maintain the melt in a molten condition. The enclosed chamber communicates with a pumping well which in turn communicates with a charging well which may communicate with another well or the main-chamber itself, with this communication being provided by ports, all of which are below the upper surface of the melt. The pumping well contains a pump which circulates the molten aluminum, drawing it from the main chamber into the pumping well and forcing it into the charging well and thence back into the main chamber. The upper surface of the melt is exposed in the charging well, and here the scrap is introduced into the melt where it liquifies to become part of the melt.

Beverage cans, being for the most part thinly drawn aluminum, do not sink readily into the melt. Indeed, if left undisturbed, they will merely float on the melt or the dross on top of it. Instead of becoming molten aluminum, the scrap aluminum oxidizes in the presence of the intense heat and becomes aluminum oxide, which is dross. Thus, unless the lightweight aluminum scrap is quickly submerged in the melt, and thereby isolated from the ambient air, it stands a good chance of merely adding to the dross instead of becoming molten aluminum.

In order to effectively submerge the aluminum scrap, it is not uncommon to equip the charging well of an aluminum furnace with an impeller which rotates in that well to create vortex. The lightweight scrap aluminum is simply dumped into the vortex where the currents immediately carry that scrap beneath the surface. However, the impeller requires a large framework to support it in a cantilevered condition over the well, and the framework in turn requires a massive foundation. While the framework has components which shift relative to each other to raise and lower the impeller and to even remove it completely from the well, the framework and its foundation, being located adjacent to the well, interfere with the loading and maintenance of the well.

In the present invention, an aluminum furnace has a charging well in which an impeller rotates, but the impeller, instead of being supported on a complex framework and massive foundation, is suspended by means of a trolley from an overhead track.

Less clutter exists along the charging wall, and it is thus more accessible for both charging and maintenance. The impeller is carried by an assembly which raises and lowers it. The well possesses a somewhat cylindrical configuration and includes both inlet and outlet ports, all arranged to complement the impeller in establishing and maintaining a suitable vortex. The configuration of the impeller is particularly suited for establishing and maintaining the vortex.

DESCRIPTION OF THE DRAWINGS

In the accompanying drawings which form part of the specification and wherein like numerals and letters refer to like parts where they occur

FIG. 7 is a perspective view of the vortex generator;

FIG. 8 is a side elevational view of the vortex generator taken along line 8—8 of FIG. 7; and FIG. 9 is a rear elevational view of the vortex generator taken along line 9—9 of FIG. 7.

DETAILED DESCRIPTION

Figure 1:
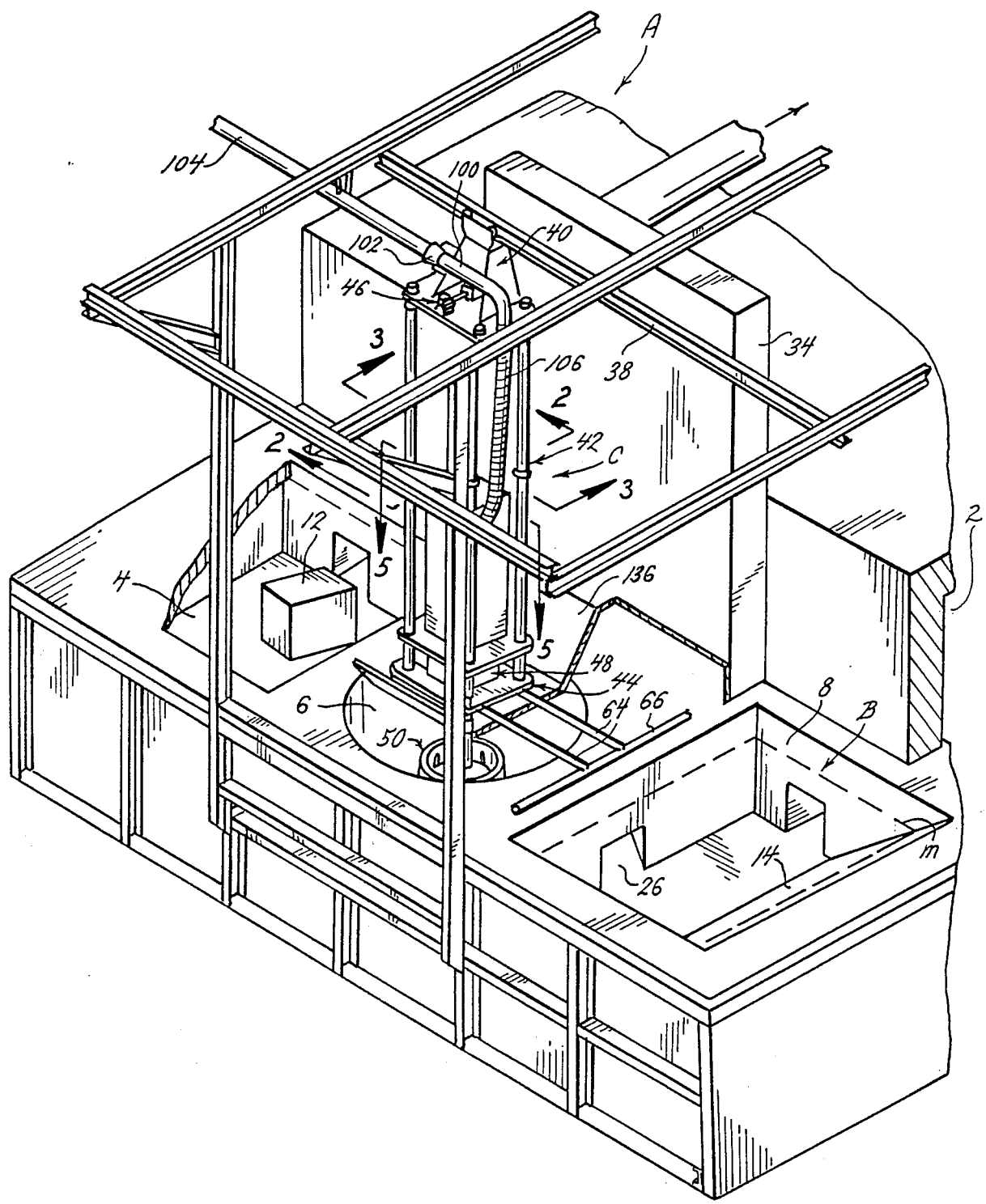
FIG. 1 is a perspective view of the charging well and adjacent wells of a furnance for maintaining metal in a molten condition, with the furnace being provided with a vortex generator constructed in accordance with the embodiment of the present invention.

Referring now to the drawings, a furnace A (FIG. 1) for melting aluminum includes a main chamber 2, which is completely enclosed, and further includes a pumping well 4, a charging well 6 and a dross well 8 arranged in that order along the front of the furnace A. The charging well 6 opens into the wells 4 and 8 on each side of it, and the wells 4 and 8 in turn open into the main chamber 2. In addition, the furnace A possesses burners which are directed into the main chamber 2, either from or near the roof of it, and these burners produce enough heat and sufficient temperatures to maintain the aluminum in a molten condition, that is as a melt B within the main chamber 2, as well as in the connected wells 4, 6, and 8. The melt B, of course, has an upper surface or melt line m which exists at essentially the same elevation in the main chamber 2 and the wells 4, 6 and 8 at any given time, but that elevation may vary from time to time depending on the volume of aluminum that constitutes the melt B.

The pumping well 4 contains a pump 12 (FIG. 1) which circulates the molten aluminum of the melt B, drawing it from the main chamber 2 into the pumping well 4 and discharging it into the charging well 6, to thereby force the molten aluminum from the charging well 6 into the dross well 8 and thence back into the main chamber 2. The dross well 8 along at least one of its sides has a ramp 14, to facilitate removal of dross from the melt B. To this end, a workman with a suitable rake or other tool merely skims the dross from the upper surface of the melt B within the dross well 8 and draws it up onto the ramp 4 and out of the well 8. The main chamber 2 as well as the three wells 4, 6 and 8 are constructed from or at least lined with a suitable refractory to withstand the elevated temperature of the melt B.

The portion of the melt B that exists within the charging well 6 may be set into a swirling motion so as to acquire a vortex, and this swirling motion is derived from a vortex generator C which for the most part is located above the well 6, but does extend downwardly into it and the melt B. Aluminum scrap of relatively small size, such as aluminum beverage cans or aluminum chips or turnings derived from machining operations, is introduced into the melt B at the charging well 6 —indeed, into the vortex created within the melt B. The swirling molten metal of the vortex immediately draws this scrap below the upper surface of the melt B, thereby preventing the scrap from oxidizing and becoming part of the dross.

Figure 6:
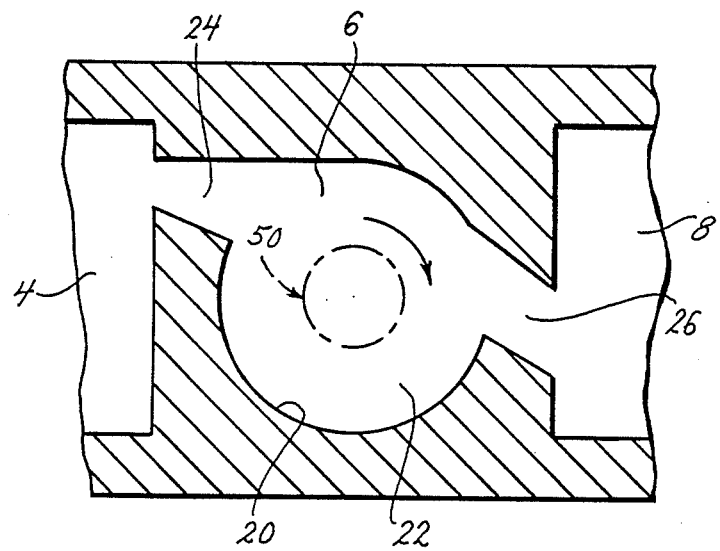
FIG. 6 is a sectional view of the charging well taken along line 6—6 of FIG. 3.

The charging well 6 (FIGS. 3 & 6) possesses a cylindrical configuration, it having a cylindrical side surface 20 and a flat bottom surface 22. It communicates with the pumping well 4 through an inlet port 24 which diverges toward the charging well 6, so that its cross-sectional area at the well 4 is smaller than its cross-sectional area at the well 6. One of the side walls of the inlet port 24 lies tangent to the cylindrical surface 20 of the well 6 at the very back of the well 6, while the other side wall diverges from the tangent wall and lies generally perpendicular to the cylindrical surface 20 where it intersects that surface. The bottom wall of the port 24 lies flush with the bottom surface 22 of the charging well 6, while the top surface rises from the pumping well 4 to the charging well 6, but at every elevation remains well below the melt line m. On its opposite side, the charging well 6 communicates with the dross well 8 through an outlet port 26 which is generally centered between the front and back of the well 6, at least where it opens out of the well 6. The outlet port 26 is directed obliquely away from cylindrical surface 20 of the well 6, that is its orientation lies between radial and tangential, so that it is directed from the side of the cylindrical charging well 6 toward the front of the dross well 8, but of course it opens into the dross well 8 through the side of that well. Moreover, the side walls of the outlet port 26 converge slightly from the charging well 6 to the dross well 8. The bottom wall, on the other hand, lies flush with the bottom surface 22 of the charging well 6, while the top wall extends parallel to it at an elevation above the uppermost point of the top wall for the inlet port 24. Indeed, the top wall of the outlet port 26 lies at a minimum of 4 inches beneath melt line m. The top of the charging well 6 is open, at least when the vortex generator C is removed from the well 6.

The charging well 6 is actually charged with scrap aluminum through a chute 30 (FIGS. 2 & 5) which is directed over the front of the well 6 and is inclined downwardly toward generally the center of the well 6. The chute 30 is norally attached to the front of the furnace A, but is removable to facilitate maintenance of both it and the well 6. Extending along the periphery of the well 6 where it opens upwardly is fume collecting rim 32 (FIG. 3), and this rim directly opposite from the chute 30 is connected to a discharge stack 34 (FIGS. 1-3 & 5) which in turn leads to an exhaust fan.

Located directly over the charging well 6 is a monorail or track 38 (FIGS. 1-3) which is suspended from a structural framework constructed over the furnace A. The track 38 extends laterally beyond one or both sides of the well 6 -indeed laterally beyond the furnace A itself. It may be an I-beam, but in any event should have laterally directed flanges. The vortex generator C is suspended from the track 38 and may be moved along it between an operative position over the charging well 6 and a remote position beyond the furnace A itself.

The vortex generator C (FIGS. 7-9) basically includes a trolley 40 which moves along the track 38, an elevator frame 42 which depends from the trolley 40, an elevator 44 which is located along the elevator frame 42, an elevating mechanism 46 for raising and lowering the elevator 44 on the frame 42 and the frame 42 on the trolley 40, a drive unit 48 on the carrier 44 and an impeller 50 attached to the drive unit 48 and rotated thereby. The foregoing are essentially arranged in that order from the track 38 downwardly.

Considering the trolley 40 first, it has wheels 52 which ride on the two lowermost flanges of the track 38 and, in addition, it has a reversible electric motor 54 which is coupled to the wheels 52 to rotate them in either direction, thus enabling the trolley 40 to move to and fro along the track 38. The trolley 40 flares outwardly from the region of its wheels 52 and at its lower end is provided with a horizontal mounting plate 56 of rectangular configuration. At each of its corners, the plate 56 is fitted with bushings 58.

The elevator frame 42 extends downwardly from the trolley 40 and is in effect suspended from the trolley 40. To this end, the frame 42 has vertical guide rods 60 which at their upper ends are received in the bushing 58 of the trolley 40, there being stops 59 immediately beyond the bushings 58 to prevent the rods 60 from falling completely through the bushings 58. At their lower ends, the rods 60 are fastened rigidly to a rectangular base plate 62, and the base plate 62 in turn has horizontal stabilizing bars 64 fitted to it. The bars 64 project laterally in both directions beyond the plate 62, and indeed exceed the diameter of the cylindrical side surface 20 of the charging well 6. Those ends of the bars 64 which are presented toward the pumping well 4 remain free, while the opposite ends are connected by a cross bar 66, which projects both forwardly and rearwardly from the transverse stabilizing bars 64. The ends of the cross bar 66 likewise remain free. When the vortex generator C assumes its operative position over the charging well 6, the bars 64 and 66 rest on the top of the rim 32 that surrounds the charging well 6.

The guide rods 60 slide within the bushings 58 in the mounting plate 56 of the trolley 40, and by this arrangement, it is possible to lift the entire elevator frame 42 upwardly and thus raise the bars 64 and 66 at above the charging well 6. Intermediate their ends, the guide rods 60 are fitted with collars 68 which are attached firmly to the rods 60 so that they cannot be displaced axially on the rods 60.

The elevator 44 is located along the guide rods 60 of the elevator frame 42 between the base plate 62 and collars 68 where it serves as a platform for the drive unit 48. It includes a horizontal plate 70 of rectangular configuration and guide sleeves 72 located at the corners of plate 70. The guide rods 60 of the elevator frame 42 pass through the sleeves 72, and thus, the elevator 44 can move upwardly and downwardly between the base plate 62 and collars 68 of the elevator frame 42.

Figure 3:
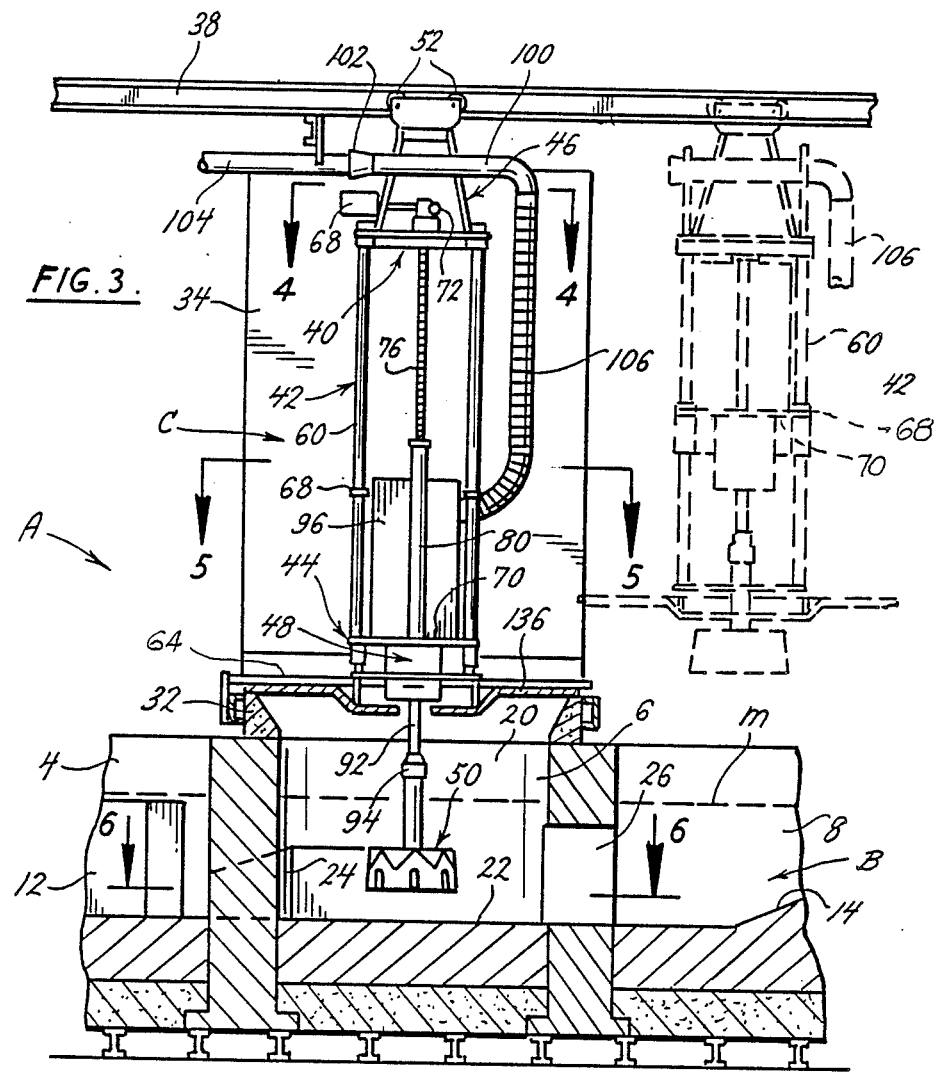
FIG. 3 is a sectional view taken along line 3—3 of FIG. 1 and showing the vortex generator in front elevation.
Figure 4:
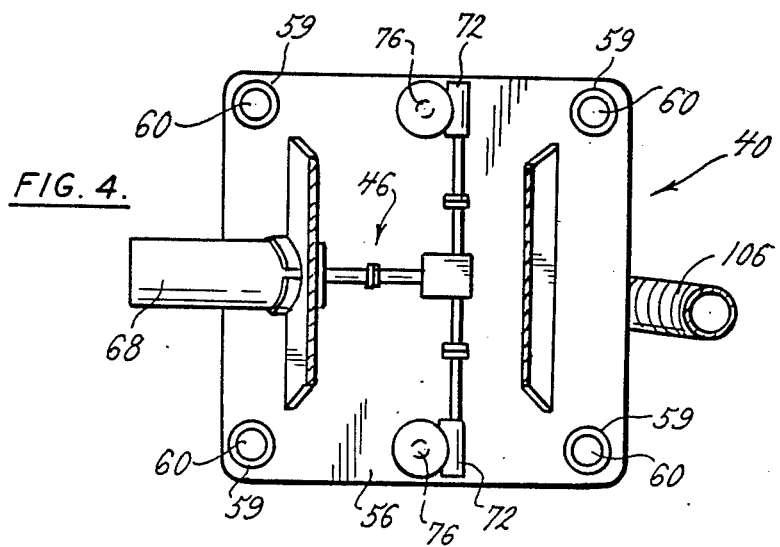
FIG. 4 is a sectional view of the vortex generator taken along line 4—4 of FIG. 3.

The elevating mechanism 46 moves the elevator 44 upwardly and downwardly on the guide rods 60 of the elevator frame 44, and further has the capacity to lift the elevator frame 44. It includes a reversible electric motor 74 which is bolted to the mounting plate 56 of the trolley 40 and a pair of lead screws 76 which extend downwardly from the plate 56 midway between the guide rods 60 at the front of the trolley 40 and likewise midway between the guide rods 60 at the rear of the trolley 40. The motor 74 is coupled with the lead screws 76 through gear boxes 78 which are bolted to the plate 56 of the trolley 40. In addition, the elevating mechanism 46 includes tubes 80 which are directed upwardly from the horizontal plate 70 of the elevator 44, to which they are attached, and these tubes align with and indeed receive the lead screws 76. Each tube 74 at its upper end is securely fitted with a nut 82 through which the lead screw 76 for that tube 80 threads. Thus, the rotation of the motor 74 is transferred through the gear boxes 78 to the lead screws 76 which revolve in the nuts 82, thereby causing the elevator 44 to move upwardly or downwardly on the guide rods 60, the direction of movement depending on the direction of rotation. Should the elevator 44 rise far enough to encounter the collars 68 on the guide rods 60, the elevating mechanism 46 will further lift the elevator frame 42, causing its guide rods 60 to slide upwardly through the bushings 68 (FIG. 3 - phantom outline).

The drive unit 48 moves upwardly and downwardly with the elevator 44, for it is carried by mounting plate 70 on the elevator 44. It includes a bearing box 84 which is attached to the plate 70 at the underside of that plate, and the bearing box 84, in turn, contains a pair of axially aligned bearings 86, both of which are set somewhat below the plate 70. In addition, the drive unit 48 includes a gear motor 88 which rests on the plate 70 over the bearing box 84, and the motor 88 projects an output shaft 90 downwardly through the plate 70 and into the bearing box 84. Here the shaft 90 couples with a drive shaft 92 which extends through the bearings 86 and cut of the bearing box 84 where it, in turn, is fitted with a coupling 94.

The gear motor 88 is contained within a housing 96 which rests on the mounting plate 70 of the elevator 44, and the interior of the housing 96 communicates with the interior of the bearing box 84 through apertures in the mounting plate 70. The housing 96 isolates the motor 88 from the intense heat of the melt B, and further serves to confine cooling air to the region of the motor 84 and to direct that cooling air on to the bearing box 84. To this end, the trolley 40 has a rigid duct 100 extended along it parallel to the track 38, but of course somewhat below the track 38. One end of the duct 100 is fitted with a socket 102 which flares outwardly to receive the end of a fixed duct 104 that extends along the track 38. Indeed, when the vortex generator C is centered over the charging well 6, the fixed duct 104 fits into the socket 102, thus connecting the two ducts 100 and 104. However, when the vortex generator C is displaced from the charging well 6, the two ducts 100 and 104 are detached. The fixed duct 104 is connected to a fan that supplies air to it and, of course, to the duct 100 when the two are coupled at the socket 102. The rigid duct 100 extends along the trolley 40 and at its opposite end is connected to a flexible duct 106 which not only has the ability to flex laterally, but also has the capacity to contract longitudinally. The flexible duct 106 at its lower end is connected to and opens into the housing 96 of the drive unit 48. Thus, when the socket 102 on the rigid duct 100 connects with the fixed duct 104, which is when the vortex generator C is centered over the charging well 6, the housing 96 receives a steady stream of cool air from the flexible duct 106, and this air circulates past the gear motor 88 and then into the bearing box 84 where it circulates past the bearings 86. Thus, both the gear motor 88 and bearings 86 remain cool, notwithstanding the presence of the underlying melt B.

The impeller 50 (FIGS. 7-9) is connected to the drive unit 48 at the coupling 94 and hence rotates with the drive shaft 92. It possesses a slightly tapered and generally circular side wall 110 that surrounds a generally hollow interior 112 which at its bottom is closed by an end wall 114, but the hollow interior 112 is open at its top so as to be exposed upwardly toward the drive unit 48. In addition, the impeller 50 includes a shank 116 which rises upwardly from the end wall 114 and extends through the hollow interior 112, beyond which it is connected to the drive shaft 92 of the drive unit 48 at the coupling 94. Thus, the shank 116 lies along the axis of rotation for the impeller 50. The axial centerline of the side wall 110 coincides with the axis of rotation, so that the side wall 110 and the shank 116 of the impeller 50 and the cylindrical surface 20 of the charging well 6 are all concentric.

The interior surface of the side wall 110 is truly cylindrical, but the exterior surface tapers slightly inwardly from the end wall 114 and contains triangular segments 118 that are convex, as well as planar segments 120 that are oblique to the axis of rotation. The planar segments 120 are arranged circumferentially around the side wall 110 and as such impart a generally circular configuration to the exterior of the side wall 110. Being planar, the segments 120, at least at their midportions, are set inwardly from the otherwise circular configuration. The upper edge of side wall 110, like the lower face of the end wall 114, lies in a plane that is perpendicular to the axis of rotation. The triangular segments 118 lie along upper edges, but are separated by the planar segments 120 which extend upwardly from the periphery of the lower end wall 114 to the upper edge. Each planar segment 120 has a straight lower margin that lies along and forms part of the periphery of the lower end wall 114 and, in addition, a pair of generally parallel side margins which it shares, with adjacent planar segments 120, and converging upper margins which extend upwardly from the side margins and intersect at the top edge of the side wall 110. As such, the converging upper margins of any planar segment 120 constitute the lower margins of contiguous triangular segments 118. Within each of its planar segments 120, the side wall 110 of the impeller 50 is provided with an elongated aperture 122 that extends completely through the side wall 110. Each aperture 122 is centered between the side margins of the planar segment 120 out of which it opens with its major or longitudinal axis extended vertically. It extends upwardly from the lower margin of the planar segment 122 about as high as the parallel side margins along the planar segment 122 A typical aperture 122 is about 4 inches long and 3 inches wide.

In practice, the impeller 50 rotates within the charging well 6 with its cylindrical wall 110 immersed within the melt B, the direction of rotation being such that it complements the flow of molten metal into the well 6 from the inlet port 24 and out of the well 6 through the outlet port 26. Indeed, the generally circular side wall 110 is submerged so that at least 4 inches of melt B exits over its upper margin when the impeller 50 is at rest. The centrifugal force generated by the rotation causes the molten metal to flow out of apertures 122, thereby creating a vortex with its center at the shank 116. To replace the molten metal displaced from the apertures 122, more metal from the melt B flows over the upper edge of the cylindrical wall 110 and into the hollow interior 112 of the impeller 50.

The impeller 50 is preferably constructed from graphite.

The melt B imposes some resistance to the rotation of the impeller 50 within the charging well 6, and this resistance is of course overcome by the torque applied to the drive shaft 92 by the gear motor 88. That torque is in turn resisted by the elevator frame 42.

Figure 5:
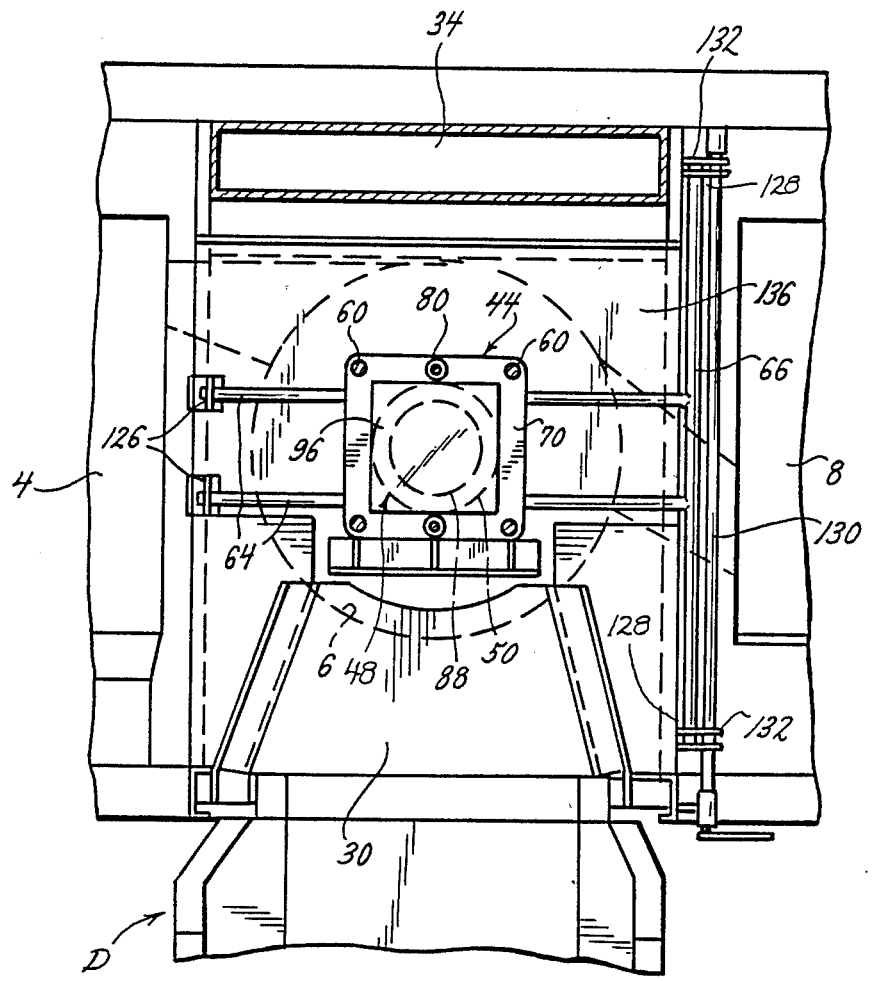
FIG. 5 is a sectional view of the vortex generator, as well as a plan view of the charging well taken along line 5—5 of FIG. 3.

In order to stablize the elevator frame 42 in the presence of the torque applied to it by the motor 88, the transverse bars 64 and cross bar 66 at their lower ends engage the rim 32 surrounding the charging well 6. The rim 32 at its upper surface has laterally opening sockets 126 which open toward the charging well 6 and the dross well 8 on the other side of the charging well 6 (FIG. 5). The free ends of the transverse bars 64 fit into the sockets 126. The free ends of the cross bar 66, on the other hand, fit into upwardly opening sockets 128 which are likewise located on the rim 32 surrounding the well 6, but are on the opposite side of the well 6. Here the rim 32 is further provided with a clamp rod 130 which, when rotated, brings clamping arms 132 over the cross bar 66 to prevent it from rising out of the sockets 128. The sockets 126, being oriented laterally, keep the free ends of the transverse bars 64 from rising. When the bars 64 and 66 are engaged with their respective sockets 126, 128, the common axis of the drive shaft 92 and impeller 50 lies along, and indeed coincident with, the axial centerline of the cylindrical charging well 6. And, of course, the rim 32 resists the torque applied by the gear motor 88.

The bars 64 and 66 easily separate from their respective sockets 126 and 128 to free the elevator frame 42. To this end, the clamp rod 130 when turned to retract the clamping arms 132, releases the ends of the cross rod from the sockets 128. Then, by shifting the vortex generator C laterally a few inches, the ends of the transverse bars 64 slide out of there sockets 126. At this time, the elevating mechanism 46 can lift the elevator frame 42 away from the well 6.

Located immediately below the bars 64 and 66 at the bottom of the elevator frame 42 is a hood 136 (FIGS. 2 & 3) which rests on the collecting rim 32 of the charging well 6 when the impeller 50 is submerged in the melt B of the charging well 6. The hood 136 covers much of the charging well 6 and thus insures that fumes enter the stack 34.

OPERATION

In the operation of the furnace A, at least when the furnace A is being charged, the vortex generator C depends from the track 38 directly over the charging well 6 with the side wall 100 of its impeller 50 totally immersed in the melt B. At this time the variable speed gear motor 88 is energized to rotate the drive shaft 92 The impeller 50, being connected to the drive shaft 92 at the coupling 94, likewise rotates-indeed at a velocity ranging between 100 and 200 rev/min. Even though the motor 88 and bearings 86 are directly over the melt B, they remain relatively cool, since cool air derived from the fixed duct 104 passes through the socket 102 and into the rigid duct 100 and thence into the flexible duct 106 which directs it into the housing 96. The cool air circulates past the motor 88 and bearings 86 within the housing 96 and prevents them from overheating.

In the charging well 6, the rotating impeller 50 imparts rotation to the molten metal within its hollow interior 112, and the accompanying centrifugal force causes the metal to flow outwardly through the apertures 122. It also creates a vortex within the well 6, with that vortex having its center at the shank 116 of the impeller 50. By reason of the vortex, molten metal along the surface of the melt B migrates toward the shank 116, and in so doing flows over the upper edge of the side wall 110 and thence downwardly into the hollow interior 112 to thus replace the metal lost through the apertures 122.

Lightweight scrap metal is introduced into the melt B through the chute 30, which being directed generally toward the center of the well 6, discharges the scrap metal into the swirling molten metal of the vortex Indeed, the swirling metal quickly draws the scrap, even though it may comprise lightweight beer cans, under the surface of the melt B where it is rapidly reduced to a molten condition and thus adds to the melt B. In short, the vortex prevents the lightweight scrap metal from lying on the surface of the melt B and oxidizing into dross instead of becoming part of the melt B itself.

The size and intensity of the vortex may be varied by changing the height of the impeller 50 or the velocity of the impeller 50 or both. The height is controlled by the elevating mechanism 46, particularly the motor 68 which turns the lead screws 76. In one direction of rotation, it raises the elevator 44, and in the other, lowers the elevator 44. The impeller 50, being connected to the elevator 44 through the shaft 92 and gear motor 88, moves upwardly and downwardly with the carrier 44. The motor 88 rotates the impeller 50 in only one direction, but its speed may be varied to control the vortex.

While the vortex generator C maintains the vortex within that portion of the melt B that is in the charging well 6, the pump 12 maintains a constant circulation of molten metal through the charging well 6. Indeed, it draws molten metal from the main chamber 2 into the pumping well 6 and forces that metal through the inlet port 24 into the charging well 6. This displaces metal from the charging well 6, causing the metal to flow through the outlet port 26 into the dross well 8 and thence back into the main chamber 2. The impeller 50 rotates in the cylindrical charging well 6 in the direction which complements, rather than opposes, the flow imparted to the molten metal by the generally tangential inlet port 24.

Figure 2:
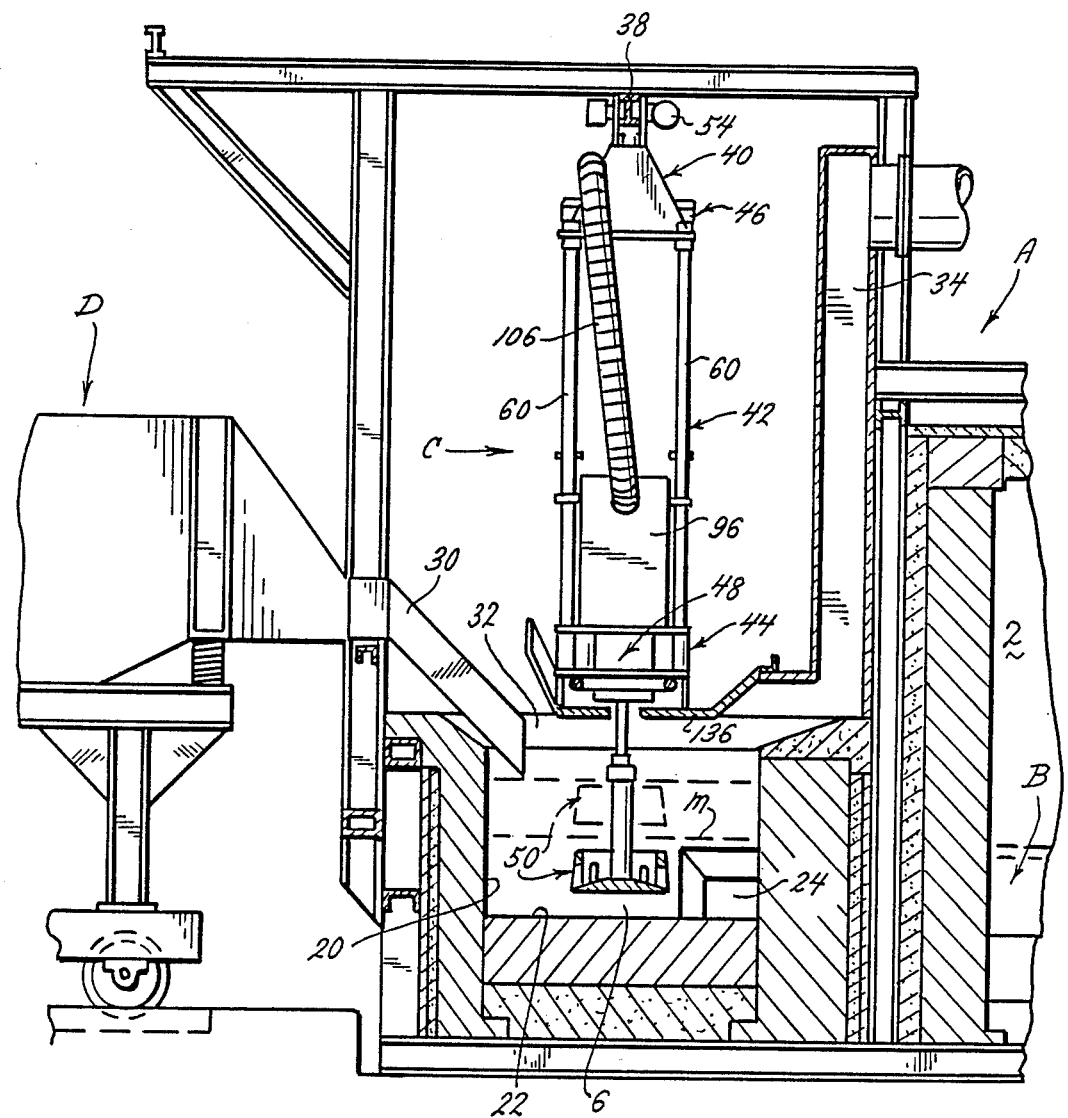
FIG. 2 is a sectional view of the furnace taken along line 2—2 of FIG. 1 and showing the vortex generator in side elevation.

Since the vortex generator C is located directly over the charging well 6, instead of in front of it, the vortex generator C does not interfere with the introduction of scrap into chute 30. Indeed, scrap from a car D may be dumped directly into the chute 30 (FIG. 2). Likewise, the vortex generator C does not interfere with inspection, cleaning or maintenance of the charging well 6 or for that matter either of the other wells 4 and 8. Indeed, the front of the furnace A at the charging well 6 remains completely unobstructed, except for perhaps the chute 30.

The scrap may contain volatile components which collect under the hood 136 and are withdrawn through the stack 34 by the exhaust fan 36. Nevertheless, the hood 136 is not essential.

Even though the impeller 50 is constructed from graphite, it must be replaced from time to time. This is easily achieved, since the elevator 44 may be elevated high enough to enable both the elevator frame 42 and the impeller 50 to clear the well 6, and when so elevated, the entire vortex generator C may be moved along the front of the furnace A to a remote position at one side of the furnace A where access to it is not in any way impaired. The displacement of the vortex generator C further leaves the charging well 6 more accessible for cleaning and maintenance.

To remove the vortex generator C to a position along the side of the furnace A, the motor 74 of the elevating mechanism 46 is energized to provide the appropriate direction of rotation to the lead screws 76 which rotate in the nuts 82. This causes the nuts 76 to climb upwardly along the screws 70, bringing the elevator 44 with it. In time the plate 70 of the elevator 44 reaches the collars 68 on the guide rods 60, whereupon further ascent of the elevator 44 also lifts the elevator frame 42, its rods 60 sliding through the bushings 58 in the mounting plate 56 of the trolley 40. The motor 74 remains energized long enough to lift both the impeller 50 and the bars 64 and 66 of the elevator frame 42 above the collecting rim 32 that surrounds charging well 6. With the elevator 42, elevator frame 44 and impeller 50 so raised, the motor 54 of the trolley 40 is energized, and it rotates the wheels 52 to drive the trolley 40 away from the fixed duct 104. The socket 102 on the rigid duct 100 disconnects from the fixed duct 104, and the entire vortex generator C moves along the track 38, passing from the charging well 6 and over the dross well 8 as it does. The motor 54 remains energized long enough to bring the vortex generator C beyond the dross well 8, whereupon it is stopped. At this time, the gear motor 88 may be energized to raise or lower the elevator 44 to an elevation convenient for working on the impeller 50 or drive unit 48, whatever the case may be. Again, the vortex generator C does not interfere with the charging well 6.

This invention is intended to cover all changes and modifications of the example of the invention herein chosen for purposes of the disclosure which do not constitute departures from the spirit and scope of the invention.

What is claimed is:

1. An impeller for imparting a vortex to the molten metal of a melt, said impeller comprising a shank; a generally circular side wall located concentric to the shank and having a hollow interior which opens upwardly, the side wall having a radially outwardly presented surface provided with segments that are arranged circumferentially around the wall and deviate from a true circular configuration in that their midportions are set inwardly from it, the side wall also having apertures which open out of its at the segments and provide communication between the hollow interior and the exterior of the impeller; and connecting means extended between the shank and the side wall for joining the shank and side wall, so that the two will rotate as a unit.

2. An impeller according to claim 1 wherein the connecting means comprises a wall extended between the shank and the side wall at the lower ends of the shank and side wall; and wherein the shank projects out of the hollow interior of the side wall to an elevation greater than the upper edge of the side wall.

3. An impeller according to claim 2 wherein the outwardly presented surface of the side wall, in addition to including the planar segments, includes generally triangular segments which are convex, with the triangular segments being located along the upper margin of the side wall and generally separating the upper portions of the planar segments.

4. An impeller according to claim 3 wherein the shank lies along the axis of rotation for the impeller, and the planar segments along the outside surface of the side wall are oblique to the axis of rotation.

5. In combination with a furnace which holds a melt of molten metal and maintains that melt in a molten condition, the furnace further having an exposed charging well in which a portion of the melt exists so that solid metal may be introduced into the melt at the charging well, and with a drive unit including a shaft which normally projects downwardly toward the melt in the charging well and rotates about a generally vertical axis of rotation, an improved impeller attached to the shaft of the drive unit and being normally submerged in the melt within the charging well where it rotates with the shaft about the axis of rotation to draw solid metal that is on the surface of the melt downwardly into the melt, so that the solid metal liquifies and adds to the melt, said impeller comprising: a generally annular side wall which surrounds a generally hollow interior that opens upwardly, the side wall having an outwardly presented surface including segments arranged circumferentially around the wall, with the segments deviating from a true circular configuration in that they are set inwardly from it, the side wall also having apertures which open out of the inwardly set segments and provide communication between the hollow interior and the region beyond the exterior surface of the side wall; and means for connecting the side wall to the shaft of the drive unit such that the axis of rotation for the shaft generally coincides with the axis of the annular side wall.

6. The combination according to claim 5 wherein the means for connecting the side wall to the shaft includes a shank which extends into the hollow interior.

7. The combination according to claim 6 wherein the hollow interior opens out of the impeller at the upper end of the side wall and is substantially unobstructed where it opens out of the impeller so that the melt can flow into the hollow interior.

8. The combination according to claim 6 wherein the means connecting the side wall to the shaft further includes a wall extended between the shank and the side wall at the lower ends of the shank and side wall; and wherein the shank projects out of the hollow interior of the side wall to an elevation greater than the upper edge of the side wall.

9. The combination according to claim 8 wherein the outwardly presented surface of the side wall, in addition to including the planar segments, includes generally triangular segments which are convex, with the triangular segments being located along the upper margin of the side wall and generally separating the upper portions of the planar segments.

10. The combination according to claim 8 wherein the shank lies along the axis of rotation for the impeller, and the planar segments along the outside surface of the side wall are oblique to the axis of rotation.

11. The combination according to claim 5 wherein the impeller is generally bowl-shaped and its hollow interior opens upwardly.

12. In combination with a melt of molten metal, an impeller which rotates within the melt and draws solid metal on the surface of the melt downwardly into the melt so as to liquify the solid metal and thereby add to the melt, said impeller comprising: a generally annular side wall that surrounds a generally hollow interior with the axis of the side wall lying generally coincident to the axis of rotation, the side wall on its radially outwardly presented surface including a plurality of substantially planar segments arranged circumferentially around the surface, the side wall having apertures which open out of the planar segments and provide communication between the hollow interior and the region beyond the exterior surface of the side wall, the upper end of the side wall being generally free so that the hollow interior opens upwardly within the melt; a bottom wall connected to the lower end of the side wall; and means for imparting a rotary motion to the bottom wall and side wall so that impeller rotates as a unit within the melt.

13. The combination according to claim 12 wherein the bottom wall substantially closes the bottom of the hollow interior, so that the impeller is generally bowl-shaped.

14. The combination according to claim 13 wherein the means for imparting rotary motion includes a shank which is attached to the bottom wall and rises through the hollow interior concentric to the annular side wall.

15. The combination according to claim 14 wherein the shank extends upwardly above the upper end of the side wall.

16. The combination according to claim 14 wherein the side wall, bottom wall, and shank are formed from graphite.

17. An impeller according to claim 1 wherein the inwardly set segments on the outwardly presented surface of the side wall are substantially planar.

18. An impeller according to claim 5 wherein the inwardly set segments of the outwardly presented surface for the side wall are substantially planar.

* * * * *

UNITED STATES PATENT AND TRADEMARK OFFICE
CERTIFICATE OF CORRECTION

PATENT NO. : 4,940,214

DATED : July 10, 1990

INVENTOR(S) : John R. Gillespie

It is certified that error appears in the above-identified patent and that said Letters Patent is hereby corrected as shown below:

Column 10:

Claim 9 should depend from claim 18 instead of claim 8.

Claim 10 should depend from claim 18 instead of claim 8.

Signed and Sealed this

Thirtieth Day of July, 1991

Attest:

HARRY F. MANBECK, JR.

*Attesting Officer*     *Commissioner of Patents and Trademarks*